Patented June 16, 1931

1,810,504

UNITED STATES PATENT OFFICE

GEORGE GRAHAM THORNTON, OF ERDINGTON, BIRMINGHAM, ENGLAND, ASSIGNOR TO AMERICAN ANODE, INC., OF AKRON, OHIO, A CORPORATION OF DELAWARE

MANUFACTURE OF ARTICLES FROM AQUEOUS DISPERSIONS OF RUBBER AND SIMILAR VEGETABLE RESINS OR COMPOUNDS THEREOF

No Drawing. Application filed March 22, 1928, Serial No. 263,980, and in Great Britain March 29, 1927. Renewed December 10, 1930.

This invention comprises improvements in or relating to the manufacture of articles from aqueous dispersions of rubber and similar vegetable resins or compounds thereof.

It has been proposed to manufacture articles from such dispersions by the process of electro-deposition whereby the rubber particles are deposited upon moulds forming the anode of an electrophoretic bath of compounded latex and are subsequently vulcanized. It has been proposed to manufacture such articles by dipping suitable moulds in a bath of compounded latex and subsequently vulcanizing the same. Patterns have been produced in such articles by engraving the moulds upon which the article is deposited whether by electro-deposition or dipping or by vulcanizing the dried deposit in a press having a surface thereon adapted to mould the desired pattern thereon. It is the object of this invention to provide an improved marking or pattern upon such articles for example, rubber tobacco pouches, bathing caps and the like.

According to this invention I produce articles manufactured direct from aqueous dispersions which have an irregular embossed marking thereon which may be likened to a water mark except that there are definite corrugations in the articles. This effect is attained by holding the deposit from the dispersions after drying between two plates of metal or other suitable materials the said plates having surfaces which may or may not have shallow grooves or other engraved markings and then vulcanizing the same in a suitable heated liquid with or without the application of pressure to the plates. If the plates have grooves it is found that the markings do not necessarily follow the pattern of the grooves. For a shaped article the plates should conform to the external and internal shapes respectively of the finished articles.

For example, if it is desired to produce a tobacco pouch of india rubber with a pattern of this description, I form a pouch by electrophoresis upon the anode in a bath containing rubber latex together with the necessary compounding ingredients. The product is subsequently dried by any suitable method. After stripping the pouch is placed between two plates of zinc and kept in position by rubber bands or other suitable means whereby light pressure is exerted. The pouch and plates are then placed in a bath of boiling water until vulcanization has been effected. When the pouch is removed from the bath it is found that the surface is no longer plain but has an irregular embossed marking such as has been described previously. It is obvious that without departing from the scope thereof, the present invention is applicable not only to unvulcanized or partly vulcanized natural or artificial rubber emulsions with or without additional substances, but also to natural or artificial partly vulcanized or unvulcanzed emulsions of other rubber-like substances as for example, gutta-percha or balata with or without additional substances.

What I claim is:—

1. The method of producing irregular markings on the surface of rubber articles which comprises forming a rubber deposit from an aqueous dispersion of rubber, drying the deposit, confining the dried deposit between suitably shaped plates, and immersing the deposit together with the plates in a heated liquid.

2. The method of producing irregular markings on the surface of rubber articles which comprises forming a deposit from an aqueous emulsion of rubber, drying the deposit, confining the dried deposit between suitably shaped plates and immersing the deposit together with the plates in hot water.

3. The method of producing irregular markings on the surface of rubber articles which comprises forming a deposit from an aqueous dispersion of rubber, drying the deposit, confining the deposit between smooth metallic surfaces and immersing the confined deposit in hot water.

4. Irregularly marked rubber products resulting from the vulcanization of dry deposits derived from aqueous rubber dispersions in a bath of heated liquid, in contact with suitably shaped plates.

5. Irregularly marked rubber articles resulting from the vulcanization of dry deposits derived from aqueous rubber dispersions in a hot water bath, in contact with engraved metallic plates.

In witness whereof, I have hereunto signed my name.

GEORGE GRAHAM THORNTON.